United States Patent
Verma et al.

(10) Patent No.: US 12,204,411 B2
(45) Date of Patent: Jan. 21, 2025

(54) DARK DEPLOYMENT OF INFRASTRUCTURE CLOUD SERVICE COMPONENTS FOR IMPROVED SAFETY

(71) Applicant: MICROSOFT TECHNOLOGY LICENSING, LLC, Redmond, WA (US)

(72) Inventors: Nidhi Verma, Redmond, WA (US); Hans Christian Andersen, Seattle, WA (US); Pritvinath Obla, Bellevue, WA (US); Daniel Oh, Redmond, WA (US); Rahul Nigam, Bothell, WA (US); Rohan Khanna, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 571 days.

(21) Appl. No.: 17/462,802

(22) Filed: Aug. 31, 2021

(65) Prior Publication Data
US 2023/0067057 A1 Mar. 2, 2023

(51) Int. Cl.
*G06F 11/14* (2006.01)
*G06F 8/65* (2018.01)
(Continued)

(52) U.S. Cl.
CPC .......... *G06F 11/1433* (2013.01); *G06F 8/65* (2013.01); *G06F 9/44505* (2013.01);
(Continued)

(58) Field of Classification Search
CPC ............ G06F 9/45558; G06F 9/45505; G06F 9/5072; G06F 8/65; G06F 2009/4557; G06F 11/1433
See application file for complete search history.

(56) References Cited

U.S. PATENT DOCUMENTS 10,606,577 B1 * 3/2020 Benson .............. H04L 41/0853
10,747,520 B2 * 8/2020 Shepard ................. G06Q 40/00
(Continued)

OTHER PUBLICATIONS

Chandrakala, et al., "Migration of Virtual Machine to Improve the Security of Cloud Computing", In International Journal of Electrical and Computer Engineering, vol. 8, Issue 1, Feb. 1, 2018, pp. 210-219.

(Continued)

*Primary Examiner* — Jacob D Dascomb
(74) *Attorney, Agent, or Firm* — Newport IP, LLC; Jacob P. Rohwer

(57) ABSTRACT

The techniques disclosed herein enable systems to safely deploy a plurality of upgrade variants to different resource units that provide a service by utilizing small-scale deployment and validation. To deploy upgrade variants, a system receives a selection of upgrade variants from a feature group and automatically selects an appropriate set of resource units at which to deploy the upgrade variants. The system is further configured to collect and analyze telemetry data from the set of resource units to determine if any problems have occurred as a result of the deployed upgrade variants. By analyzing the telemetry data, the system can also identify one or more upgrade variants that are causing the problems. In response, the system can remove the identified variants and proceed with deployment of the remaining upgrade variants.

17 Claims, 14 Drawing Sheets

(51) Int. Cl.
*G06F 9/445* (2018.01)
*G06F 9/455* (2018.01)
*G06F 9/50* (2006.01)

(52) U.S. Cl.
CPC ........ *G06F 9/45558* (2013.01); *G06F 9/5072* (2013.01); *G06F 2009/4557* (2013.01)

(56) References Cited

U.S. PATENT DOCUMENTS

| | | | | |
|---|---|---|---|---|
| 2010/0299664 | A1* | 11/2010 | Taylor | G06F 8/65 717/173 |
| 2013/0247022 | A1* | 9/2013 | DeJana | G06F 8/65 717/172 |
| 2016/0162322 | A1 | 6/2016 | Wu et al. | |
| 2016/0306735 | A1 | 10/2016 | Adderly et al. | |
| 2017/0249763 | A1* | 8/2017 | Garvey | G06T 11/206 |
| 2017/0364345 | A1 | 12/2017 | Fontoura et al. | |
| 2018/0136960 | A1 | 5/2018 | Zhang et al. | |
| 2018/0302303 | A1 | 10/2018 | Skovron et al. | |
| 2019/0034315 | A1* | 1/2019 | Acosta | G06F 8/658 |
| 2019/0213111 | A1 | 7/2019 | Fink et al. | |
| 2020/0387401 | A1 | 12/2020 | Zhou et al. | |
| 2020/0403855 | A1* | 12/2020 | Sarood | H04L 41/082 |

OTHER PUBLICATIONS

Zhang, et al. "CloudVisor: Retrofitting Protection of Virtual Machines in Multi-tenant Cloud with Nested Virtualization", In Proceedings of the Twenty-Third ACM Symposium on Operating Systems Principles, Oct. 23, 2011, pp. 203-216.

"International Search Report and Written Opinion Issued in PCT Application No. PCT/US22/036158", Mailed Date: Oct. 20, 2022, 14 Pages.

* cited by examiner

DARK DEPLOYMENT OF INFRASTRUCTURE CLOUD SERVICE COMPONENTS FOR IMPROVED SAFETY

BACKGROUND

As cloud computing gains popularity, more and more data and/or services are stored and/or provided online via network connections. Providing an optimal and reliable user experience is an important aspect for cloud-based platforms that offer network services. In many scenarios, a cloud-based platform may provide a service to thousands or millions of users (e.g., customers, clients, tenants, etc.) geographically dispersed around a country, or even the world. In order to provide this service, a cloud-based platform often includes different resources, such as server farms, hosted in various datacenters. These resources can be constructed using various resource units which include low-level infrastructure objects such as virtual machines, physical machines, network devices, and containers. In addition, the service can be constructed of various software components.

To continue improving the user experience and/or providing an optimal and reliable user experience, an entity providing the cloud-based service may deploy changes and/or upgrades to different resource units. The upgrades may include updated code and/or other mechanisms configured to maintain, correct, add, and/or remove functionality associated with the service provided, as well as individual resource units. In addition, due to the dynamic and unpredictable nature of many cloud-based applications, cloud-based service providers may deploy resource unit upgrades extremely frequently. In various examples, a resource unit upgrade can include certificates, compiler updates, operating system version updates, security updates, updates for utilizing new hardware, and so forth.

Unfortunately, in typical solutions, resource unit upgrades are broadly deployed without safety mechanisms in place. For example, an upgrade may be deployed to the entire breadth of a server farm (e.g., 100% of the resource units in a server farm) without first testing and validating that the upgrade functions properly. In addition, upgrades that target low-level infrastructure such as the resource units discussed above, are highly risky and non-backwards compatible. In a specific example, a resource unit upgrade may replace an operating system at a resource unit with a newer version of the operating system. Accordingly, if an unforeseen fault arises that requires rolling back the upgrade, the affected resource units must be taken offline and manually reconfigured. As will be discussed in further detail below, deploying upgrades in this way exposes the upgrade to a practically unlimited fault domain and can lead to catastrophic results if the upgrade causes a problem at the resource units.

Thus, deploying upgrades in this manner can result in widespread failures across the cloud platform which can lead to a degraded user experience and/or a loss of functionality within the cloud-based service. For instance, as a cloud-based service grows in size and complexity, managing the deployment of various upgrades can become overly burdensome and impractical. Furthermore, broadly deploying unvalidated upgrades can exacerbate the difficulty of addressing problems during deployment which can ultimately have a greater negative effect on the service. For instance, recovering from failures at the full scale of a large cloud platform can require extended downtime, significant commitment of engineering resources, and unacceptable disruption to critical applications.

It is with respect to these and other considerations that the disclosure made herein is presented.

SUMMARY

The disclosed techniques improve the efficiency and functionality of cloud-based platforms and services by providing mechanisms for small scale deployment of upgrades and associated variants to resource units. Generally described, a system selects a set of resource units at which to deploy one or more variants of an upgrade to validate the variants of the upgrade before proceeding to deploy the upgrade to the entirety of the cloud-based platform.

As described, an upgrade may include updated code and/or other mechanisms configured to maintain, correct, add, and/or remove functionality associated with the service provided. The service can include cloud-based applications that provide access to internal sites, documents, lists, libraries and the like from diverse user devices. In addition, the service can be constructed using various server farms composed of individual resource units such as virtual machines, physical machines, network devices, and containers. In various examples, the server farms may be different systems configured within the same and/or different datacenters. In another example, the server farms may be different networks configured for the same and/or different geographic locations (e.g., datacenters).

As mentioned above, existing solutions deploy upgrades very frequently and at scale without proper safety mechanisms or validation. While deploying in this manner can allow for rapid adoption of the upgrade, unforeseen problems that potentially arise due to the upgrade can cause severe problems that are significantly exacerbated by the scale of various cloud platforms. This is especially true for upgrades that target low-level resource units. As discussed previously, such upgrades often include high-risk changes that are not backwards compatible. In this way, many resource unit upgrades prevent graceful recovery in the event of a failure thereby requiring unacceptable service downtime and significant engineering effort. Thus, there is a need for cloud-based service providers to validate and deploy resource unit upgrades at a smaller scale to enable efficient testing and validation and ensure maximal availability and reliability of the cloud-based service.

In addition, due to the diversity of resource units utilized by a cloud platform, a particular resource unit upgrade may require several variants where each variant comprises a different feature set. For instance, a resource unit upgrade may be a security update in which a variant includes a security feature that targets a certain hardware configuration. Accordingly, other variants of the security update may include different features that target other hardware configurations. However, typical solutions for upgrade deployments lack the ability to select and deploy multiple variants of the same resource unit upgrade, instead requiring separate deployments for each variant.

In contrast to existing solutions, the use of small-scale upgrade deployment as described herein enables efficient testing and validation of an upgrade as well as several variants of the same upgrade. Typically, upgrades are deployed at the scale of server farms which can represent a wide fault domain that may especially hamper validation and recovery efforts for non-backward compatible upgrades. By reducing the initial scale of deployment, the system can mitigate the negative effects of problems that may arise during testing of an upgrade and greatly improve the efficiency of experimentation and debugging of upgrade variants.

To deploy an upgrade, the system can receive several variants of the upgrade and select a set of resource units to receive the upgrade variants based on various criteria such as a hardware configuration of the resource units, upgrade type, the number of variants, and so forth. In addition, the upgrade variants can be received from a feature group which can be any entity that is responsible for the upgrade and upgrade variants in question, such as a single engineer or a group of developers.

In addition, the system can be configured to collect and analyze telemetry data from the selected set of resource units to enable the feature group to view and assess the effectiveness of the variants in a live environment. Telemetry data can also define usage information of an upgrade variant at a resource unit, e.g., any new errors occurring in a software service because of the upgrade event deployment. The telemetry data can include reliability signals describing performance of a particular upgrade variant.

By analyzing the telemetry data, the system can detect that one or several upgrade variants have caused problems arising at the selected set of resource units. For instance, the system may determine that a certain compiler update variant caused an unexpected runtime error for a particular configuration of a virtual machine. As will be discussed in more detail below, the system can take various actions in response to detecting the problem such as removing the offending variant from deployment, modifying the offending variant to resolve the technical issue, and/or notifying the feature group of the problem caused by the offending variant. Once the upgrade variants have been tested and validated at the initial set of resource units, deployment can then proceed at a wider scale to provide the upgrade variants to the broader cloud platform.

As mentioned above, and in greater detail below, the disclosed techniques enable small-scale deploying of infrastructure upgrades and upgrade variants for cloud-based services. In this way, cloud-based service providers can rapidly test upgrade variants, nimbly recover from any potential problems, and minimize any the negative impact of those problems on the cloud-based service.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
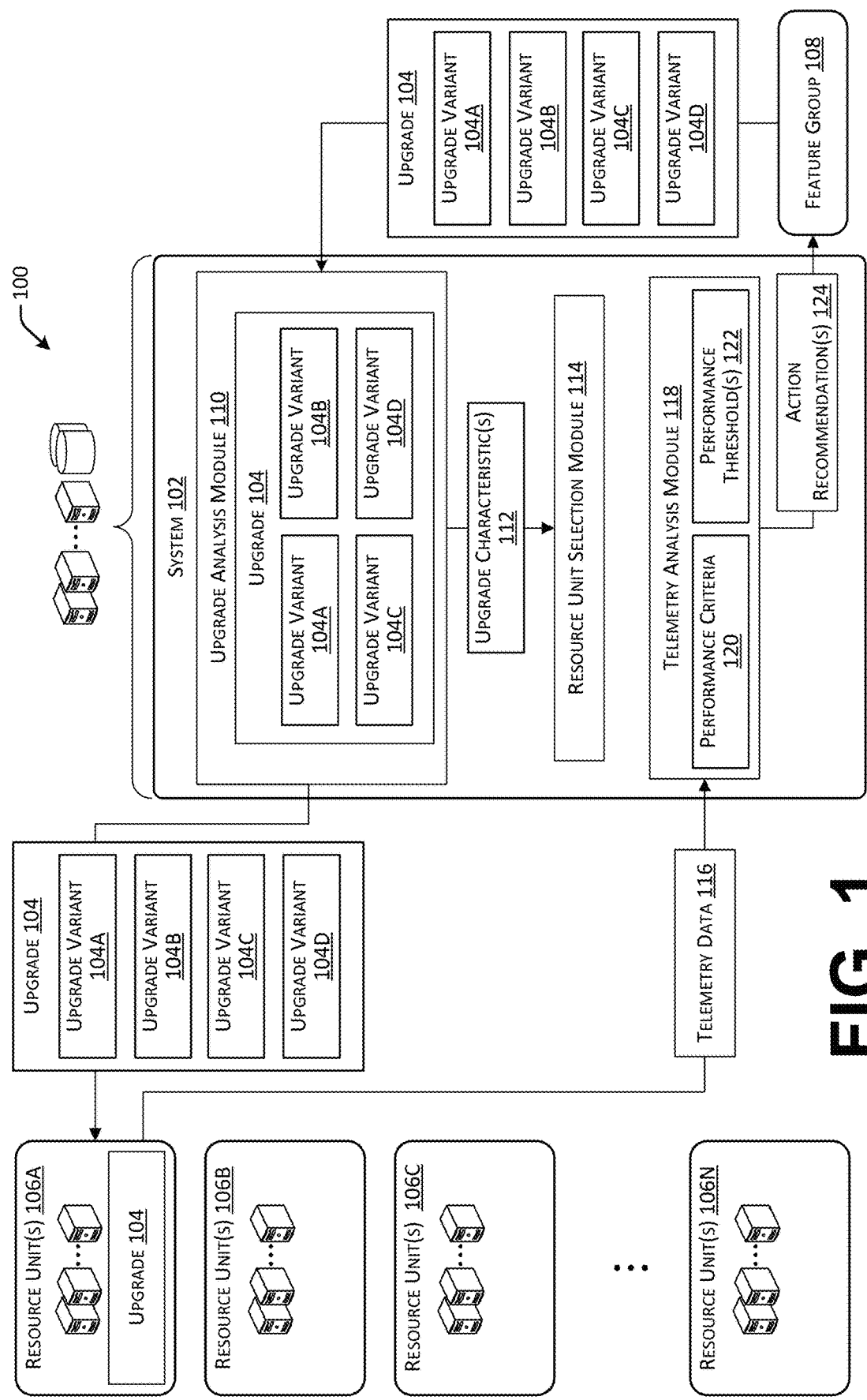
FIG. 1 illustrates an environment in which a system can deploy a set of upgrade variants to various resource units.

The techniques described herein provide systems for optimizing the use of computing resources and for improving the operation of upgrade deployment to various resource units that enable server farms to provide a cloud-based service by the introduction of small-scale deployment and upgrade variants. As mentioned above, resource units can include physical and/or virtual resource units such as virtual machines, physical machines, network devices, and containers. In addition, an upgrade can include updated code and/or other mechanisms configured to maintain, correct, add, remove or otherwise change functionality associated with the service provided, as well as individual resource units. An upgrade may also be referred to herein as a change. In one example, the service can include cloud-based applications that provide access to internal sites, documents, lists, libraries and the like from diverse user devices around the world.

The disclosed techniques address several technical problems associated with upgrade deployment for resource units (which may also be referred to herein as low-level infrastructure objects). For example, the disclosed system addresses inefficiencies and problems associated with existing upgrade deployment systems that deploy upgrades at the scale of server farms without safety mechanisms to accommodate the necessary frequency of resource unit upgrade deployments. As discussed above, however, this can expose large portions of a cloud platform to potential problems since upgrades that target resource units can be very risky and not backwards compatible. In this way, if a deployed upgrade causes a problem or fault, entire server farms may need to be taken offline to restore functionality resulting in extensive downtime and unacceptable disruptions to critical applications.

In contrast to existing solutions and as further discussed below, the disclosed techniques provide mechanisms for small-scale deployment of resource unit upgrades (e.g., a set of individual resource units as opposed to whole server farms). Deploying resource unit upgrades in this manner enables several technical benefits such as simultaneous deployment of several upgrade variants, as well as efficient validation and testing of the upgrade variants prior to wide-scale deployment to the cloud platform. In this way, a feature group can continue to frequently deploy resource unit upgrades while minimizing the potential impact of problems that arise due to the upgrade variants. In a specific example, a feature group may wish to deploy an upgrade for virtual machines to allow compatibility with a new hardware configuration (e.g., a cloud service provider has changed vendors for server hardware). Rather than immediately deploying the upgrade to entire server farms, the feature group can provide the upgrade to the system which can automatically select a subset of the available resource units at which to deploy the upgrade. As will be discussed in more detail below, the selection can be based on a diverse set of criteria to ensure a suitable subset of resource units is chosen. The system can then collect and analyze telemetry data from the selected set of resource units and determine if any problems have occurred. If a problem is detected, the system can take several courses of action to resolve the problem which is also discussed below. Thus, the system can efficiently validate resource unit upgrades and additionally conserve computing resources through small-scale deployment.

In another example of the technical benefit of the present disclosure, the capability to deploy multiple variants of an upgrade enables a feature group to easily experiment with different feature sets and debug. For instance, a feature group may have several implementations of a certain upgrade with that includes variants with differing feature sets. To assess the effectiveness of various implementations the system may be configured to deploy a group of upgrade variants to a set of resource units and another group of upgrade variants to another set of resource units. As will be discussed below, the system can analyze telemetry data from the sets of resource units using various performance criteria to compare different upgrade variants.

In still another example of the technical benefit of the present disclosure, the techniques described here can improve the security of cloud platforms and cloud-based services. As discussed above, small-scale resource upgrade deployment enables the disclosed system to minimize the potential impact of problems that arise at various resource units due to upgrade variants. In this way, the disclosed system can enhance security by preventing downtime of the cloud platform thereby removing potential vulnerabilities that can be exploited by potential attackers.

Various examples, scenarios, and aspects that enable consistent and stable deployment of upgrade events through small-scale deployment of upgrade variants and monitoring of telemetry data are described below with reference to FIGS. 1-8.

FIG. 1 illustrates an example environment 100 in which a system 102 is configured to deploy an upgrade 104 that can include one or more upgrade variants 104A-104D. As mentioned above and discussed further herein, system 102 can deploy upgrade 104 to a plurality of resource units 106A-106N (may be referred to herein as resource units 106) that make up a cloud platform. It should be understood that an individual one of the plurality of resource units 106A can comprise a single resource unit or several resource units. For instance, resource unit 106A can be a single virtual machine or a group of virtual machines. In addition, it should be understood that while upgrade 104 as illustrated contains four upgrade variants 104A-104D, an upgrade 104 can contain any number of upgrade variants.

As discussed above, resource units 106 can include various types of infrastructure objects such as virtual machines, physical machines, network devices, containers and the like that are under control of an entity providing a cloud-based service and/or operating the system 102 configured to deploy the upgrade 104 and to monitor the health and performance of the upgrade 104. To this end, each of the resource units 106A-106N provides at least a part of a service to end-users, customers, tenants, clients, etc. In addition, resource units 106 can be used to construct portions of a cloud platform (e.g., server farms) and configured to provide various cloud-based services such as access to hosted applications, computation resources, databases, and the like. Resource units 106 may also be located within the same and/or different datacenters configured at different geographic locations.

A feature group 108 can submit an upgrade 104, comprising a plurality of upgrade variants 104A-104D, to the system 102 to be deployed. The feature group 108 can be any entity that is responsible for deploying the upgrade 104 to the resource units 106A-106N such as one or more developers, a technician, a system administrator, and so forth. Upon receiving the upgrade 104, the system 102 can utilize upgrade analysis module 110 to determine various upgrade characteristics 112 such as an upgrade type (e.g., an operating system update, a compiler update, etc.), a targeted hardware configuration, a targeted resource unit type, the number of upgrade variants 104A-104D within upgrade 104, and so forth. Alternatively, upgrade characteristics 112 may be provided to the system 102 by feature group 108 as one or more predefined characteristics. In another example, upgrade characteristics 112 can be a combination of predefined characteristics and characteristics that are automatically determined by upgrade analysis module 110.

Upgrade analysis module 110 can subsequently provide upgrade characteristics 112 to a resource unit selection module 114. Accordingly, resource unit selection module 114 can use upgrade characteristics 112 as criteria for selecting the resource units 106A, from the plurality of resource units 106A-106N, as the set to which the upgrade variants 104A-104D is deployed. In a specific example, upgrade 104 may be an operating system update that targets virtual machines (e.g., hundreds or thousands of virtual machines). Accordingly, resource unit selection module 114 can select a set of resource units 106A that are virtual machines and are executing the targeted version of the operating system. As mentioned above, resource unit(s) 106A can be a single resource unit or several resource units. For the purposes of the present discussion, resource units 106A can be considered as a plurality of resource units. In addition, individual resource units within resource units 106A can receive some or all of the upgrade variants 104A-104D. For instance, feature group 108 may specify that a portion of the selected set of resource units 106A are to receive all upgrade variants 104A-104D while others only receive a single upgrade variant 104A. In addition, the size of the selected set of resource units can be based on the number of upgrade variants 104A-104D in a particular upgrade 104. For instance, an upgrade 104 having only a few upgrade variants (e.g., five) may only require a small set of resource units 106A to deploy (e.g., ten to twenty). Conversely, an upgrade 104 having many upgrade variants (e.g., a dozen) may require a comparatively larger set of resource units 106A (e.g., a hundred).

The system 102 can be further configured to automatically collect and analyze telemetry data 116 from resource units 106A using telemetry analysis module 118. Telemetry data 116 can describe many aspects of the execution of upgrade 104 at resource units 106A such as resource usage, performance metrics, and any errors that may have occurred. As will be further detailed below, analysis of telemetry data 116 enables the system 102 to assess and compare performance levels for various upgrade variants 104A-104D. In addition, telemetry analysis module 118 can include various performance criteria 120 that can be utilized to determine a level of performance for an upgrade variant 104A. In various examples, this can include assigning a one or more numerical scores to quantify the performance of an upgrade variant 104A. In addition, telemetry analysis module 118 can compare levels of performance for an upgrade variant 104A against one or more performance thresholds 122. For example, feature group 108 may define an acceptable level of network latency for a given resource unit 106A.

As mentioned, analysis of telemetry data 116 also enables telemetry analysis module 118 to detect problems at resource units 106A that have occurred in response to execution of upgrade variants 104A-104D and identify upgrade variants that are causing the problems. Problems at resource units 106A can include unresponsive resource units, application crashes, degraded performance, high latency, abnormal resource usage, and the like. In a specific example, upgrade variant 104A, as part of an operating system update, may implement a new feature to improve network speeds for virtual machines. However, upon collecting telemetry data 116, telemetry analysis module 118 may detect unexpectedly high resource usage in resource units 106A that received upgrade variant 104A.

In response to detecting problems at the resource units 106A based on telemetry data 116, the system 102 can take several courses of action to resolve various issues. For instance, telemetry analysis module 118, upon detecting a problem at resource units 106A, can generate one or more action recommendations 124 to notify feature group 108 of detected problems. Action recommendation 124 can also include a proposed course of action for feature group 108 to address a detected problem. In a specific example, telemetry analysis module 118 can notify feature group 108 that the networking feature implemented by upgrade variant 104A is causing extremely high resource usage. By providing specific information on various problems, the system 102 can enable feature group 108 to focus engineering effort to efficiently address issues. Telemetry analysis module 118 can accordingly propose that feature group 108 remove the problematic upgrade variant 104A from deployment. Alternatively, the system 102 can automatically execute proposed actions such as removing an upgrade variant 104A and subsequently notify feature group 108 of the action taken.

Figure 2A:
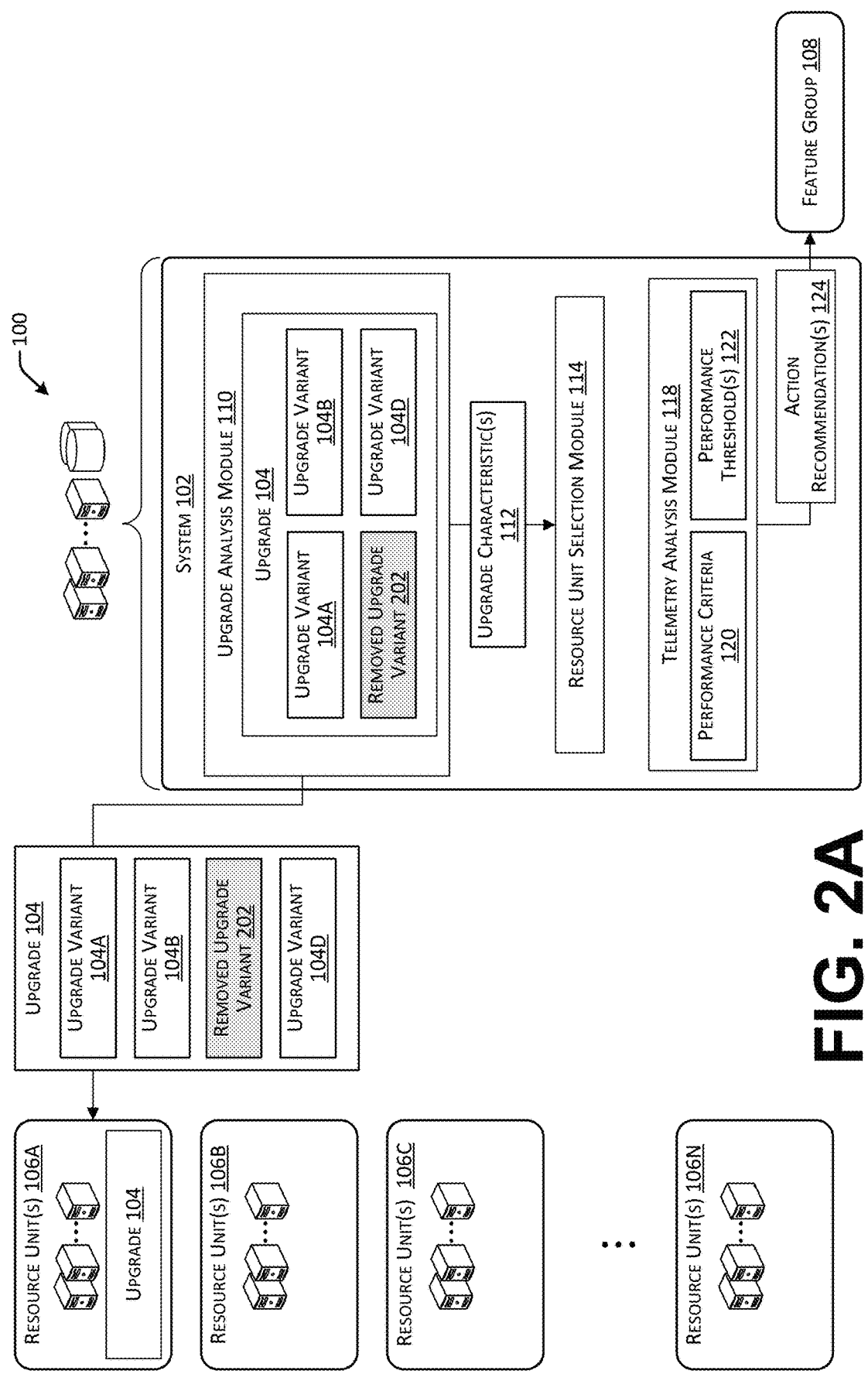
FIG. 2A illustrates aspects of the system in a process for validating one or more upgrade variants.

For instance, as illustrated in FIG. 2A, telemetry analysis module 118 may have detected that problems have occurred at resource units 106A in response to executing upgrade variant 104C. Accordingly, the system 102 removes upgrade variant 104C (referred to in FIG. 2A as removed upgrade variant 202) from active deployment at resource units 106A and generates an action recommendation 124 to notify feature group 108 of the problem and actions taken by system 102. As discussed above, action recommendation 124 can include specific information regarding the detected problems derived from telemetry data 116 such as various metrics, logs, traces, and the like. Alternatively, telemetry analysis module 118 may be configured to notify feature group 108 of a problem and refrain from automatically removing upgrade variant 104C from active deployment. In this way, feature group 108 can elect to continue observing upgrade variant 104C and fully assess the extent of potential issues.

In a specific example, removed upgrade variant 202 may have caused high resource consumption at resource units 106A that executed removed upgrade variant 202. However, feature group 108 may have anticipated this behavior and wish to measure the impact of removed upgrade variant 202 on the performance of resource units 106A. Feature group 108 can configure the system 102 to prevent automatic removal of upgrade variant 104C from deployment. As will be discussed in greater detail below, affording flexibility to feature group 108 as to which upgrade variants 104A-104D are deployed enables feature group 108 to compare various upgrade variants 104A-104D and assess the effectiveness of upgrade variants 104A-104D for various situations. In this way, system 102, through small-scale deployment of upgrades 104, can enable more efficient testing and debugging of features for upgrade variants 104A-104D.

Figure 2B:
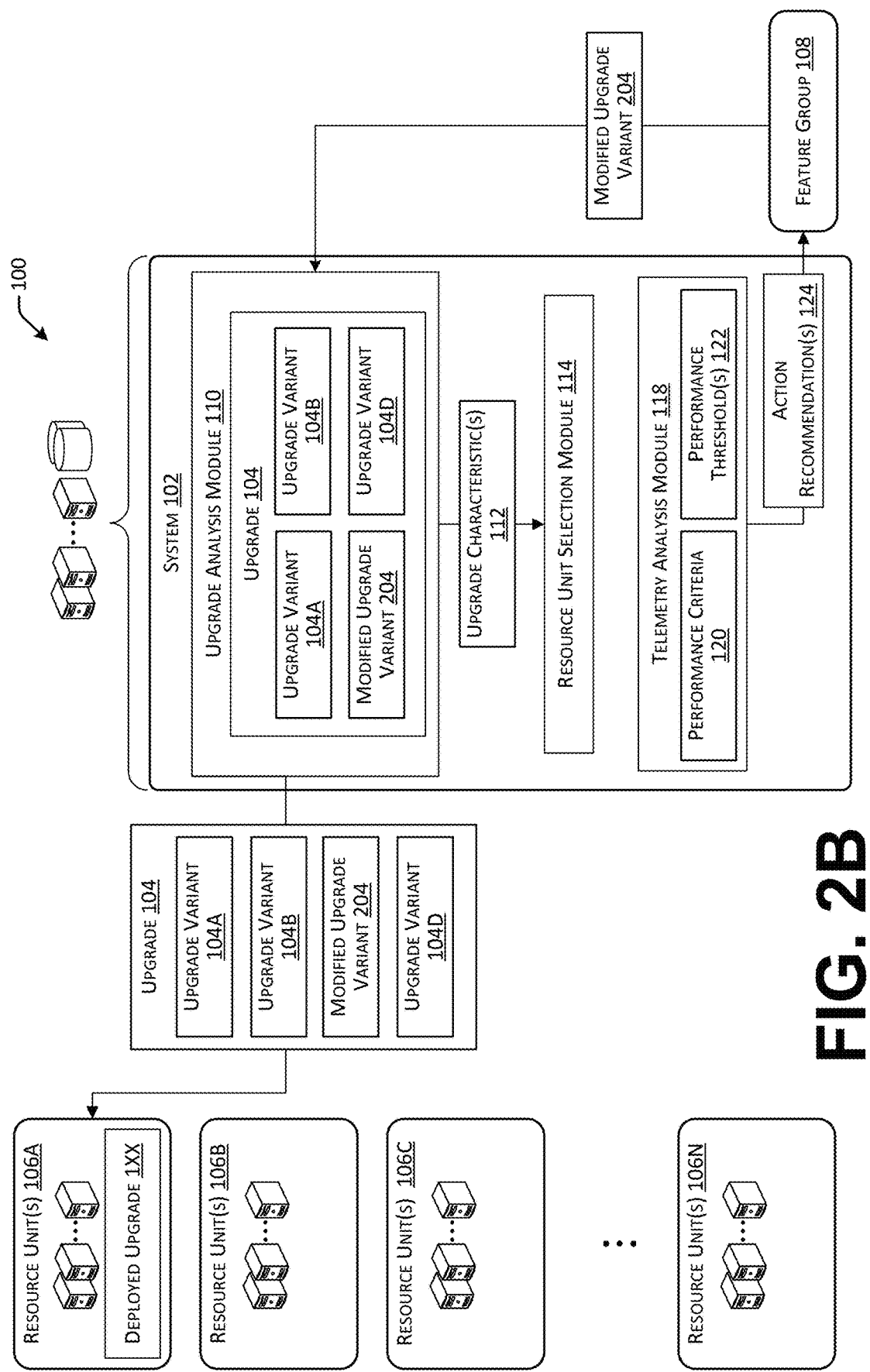
FIG. 2B illustrates alternative aspects of the system in a process for validating one or more upgrade variants.

In another example of the capabilities of telemetry analysis module 118, system 102 may resolve an issue by modifying an upgrade variant 104A-104D that is causing problems at resource units 106A as illustrated in FIG. 2B. For instance, as in the previous example illustrated in FIG. 2A, telemetry analysis module 118 may detect that upgrade variant 104C is causing excessive resource consumption at resource units 106A. In response, system 102 can generate modified upgrade variant 204 to replace upgrade variant 104C and reduce resource consumption and potentially prevent failure of resource units 106A. As will be discussed further below, modified upgrade variant 204 can be generated in a variety of ways such as by disabling certain features using feature flags, generating error tags to place limits on modified upgrade variant 204, and so forth. Alternatively, like the above example in FIG. 2A, telemetry analysis module 118 may generate an action recommendation 124 to notify feature group 108 of problems at resource units 106A without modifying the upgrade variant 104C. In this example, feature group 108 can provide system 102 with a modified upgrade variant 204 to replace upgrade variant 104C. It should be understood that the modified upgrade variant 204 provided by feature group 108 can differ from modified upgrade variant 204 that is automatically generated by the system 102. For example, modified upgrade variant 204 as provided by feature group 108 may contain more complex revisions to source code to correct errors.

Figure 2C:
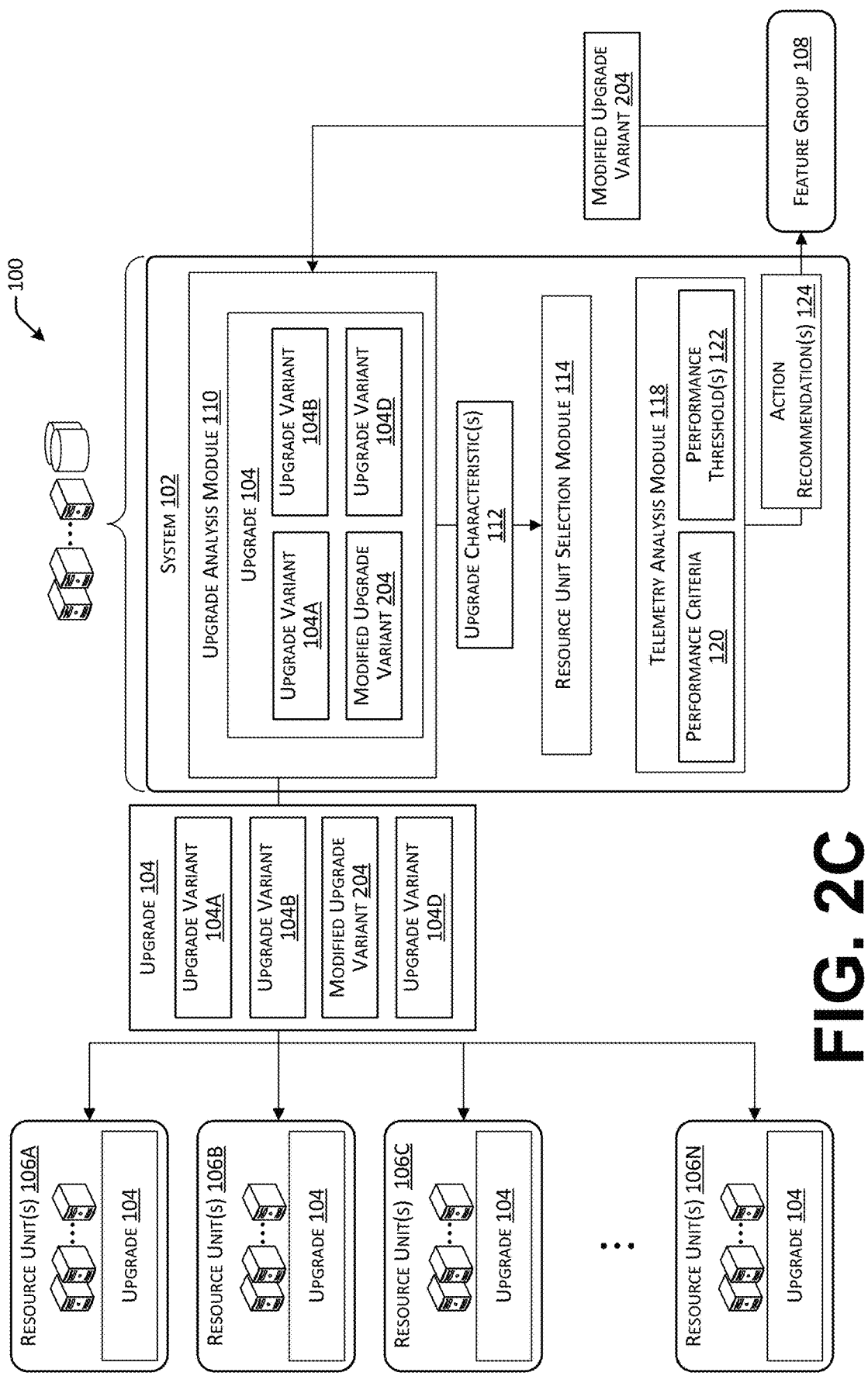
FIG. 2C illustrates aspects of the system in the process for deploying the set of upgrade variants following validation of the upgrade variants.

Proceeding now to FIG. 2C, based on the action recommendation 124, feature group 108 has elected to resolve various problems by providing a modified upgrade variant 204 to replace upgrade variant 104C in upgrade 104. Additional validation, such as the techniques shown and discussed in FIG. 1 through FIG. 2B, may indicate no additional problems at resource units 106A. Accordingly, upgrade 104 can proceed to more wide scale deployment and target all applicable resource units 106 across various server farms, as shown in FIG. 2C via the arrow to each of resource units 106A-106N. By employing small-scale deployment to enable rapid validation of upgrade variants 104A-104D, system 102 can safely deploy upgrade 104 to all resource units 106.

As discussed with respect to the examples illustrated in FIG. 1 through FIG. 2C, the techniques described herein enable a feature group 108 to deploy a resource unit upgrade 104 at a small scale (e.g., individual resource units 106). In this way, the system 102 can greatly reduce the fault domain of an upgrade 104 thereby minimizing the potential impact of potential problems. This is especially crucial for upgrades 104 that target low-level infrastructure objects such as the above-mentioned resource units 106 as these upgrades 104 tend to be highly risky and non-backwards compatible. Furthermore, in the event a problem does arise at a resource unit 106, significantly less engineering effort is required to resolve the problem and restore functionality to affected resource units 106.

Figure 3A:
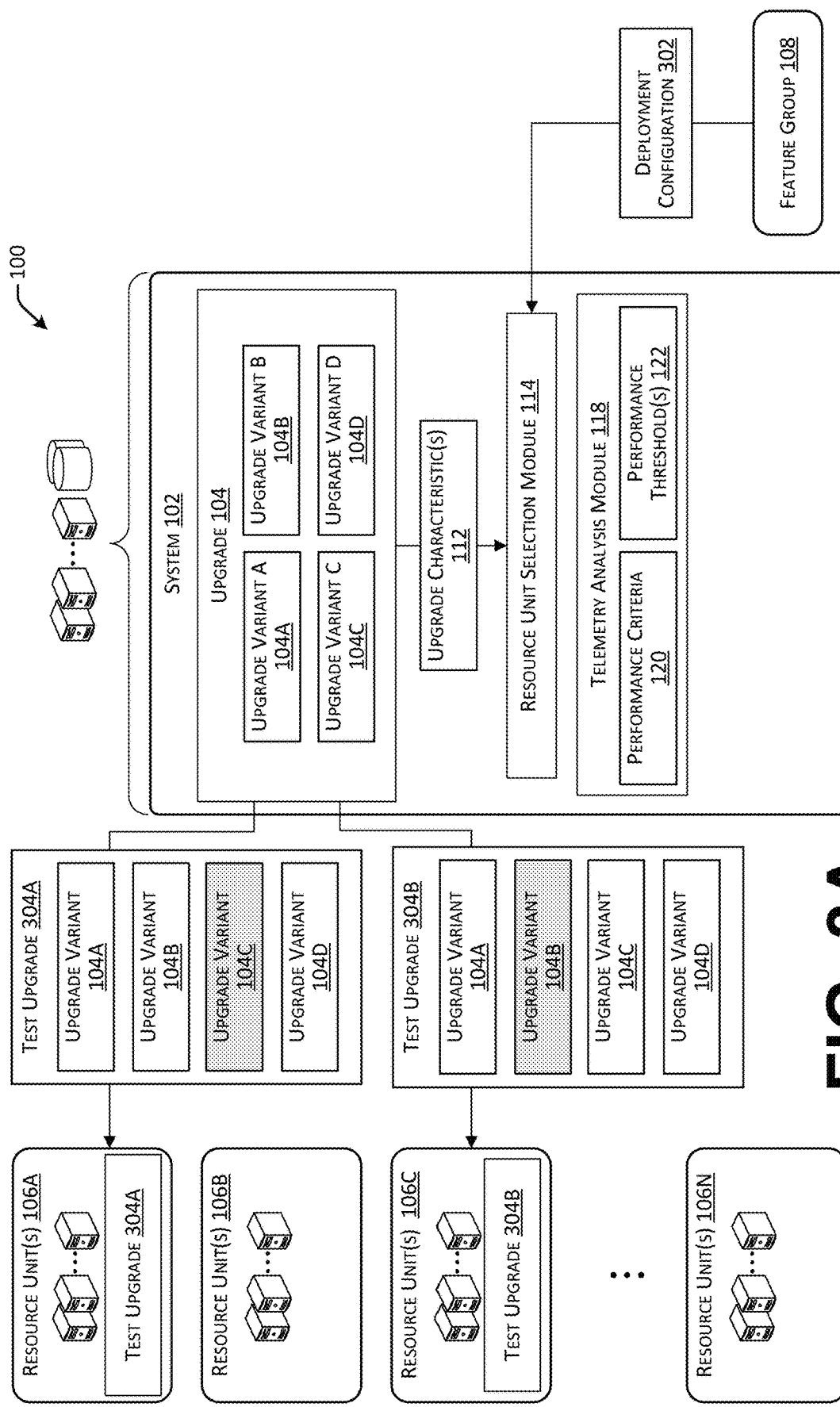
FIG. 3A illustrates aspects of the system in a first state of a process for evaluating performance for various sets of upgrade variants.

Turning now to FIG. 3A, additional aspects of a system 102 for selecting and deploying a plurality of upgrade variants 104A-104D are shown and described. More specifically, FIG. 3A illustrates features that enable efficient experimentation and comparison of differing upgrade variants 104A-104D. As in previously discussed examples, system 102 has received an upgrade 104 having upgrade variants 104A-104D from feature group 108. In this example, however, feature group 108 may provide a deployment configuration 302 to system 102 to cause deployment of multiple upgrades 104 having differing sets of upgrade variants 104A-104D referred to here as test upgrades 304A and 304B (may also be referred to herein as test upgrades 304). As shown in FIG. 3A, test upgrade 304A includes upgrade variants 104A, 104B, and 104D. Upgrade variant 104C is omitted from test upgrade A 304A as indicated by the shading. Conversely, test upgrade 304B includes upgrade variants 104A, 104C, and 104D with upgrade variant 104B omitted. Thus, test upgrade 304A may implement a first feature set with upgrade variants 104A, 104B, and 104D while test upgrade 304B implements a second feature set using upgrade variants 104A, 104C, and 104D. As further illustrated in FIG. 3A, resource unit selection module 114 has chosen to deploy test upgrade 304A to resource units 106A and test upgrade 304B to resource units 106C. Deployment configuration 302 may contain additional settings provided by feature group 108. For instance, feature group 108 may wish to deploy test upgrades 304 during a specific period of time to ensure maximal traffic to the test upgrades 304. As previously discussed, resource units 106A can be selected based on upgrade characteristics 112. In addition, the size of the selected set of resource units 106A can also be determined based on the number of upgrade variants 106A-106D that are selected for deployment.

As discussed above, resource unit selection module 114 can automatically select an appropriate set of resource units at which to deploy an upgrade 104 based on upgrade characteristics 112. In the present example, to accurately compare the effectiveness of upgrade variants 104A-104D, resource unit selection module 114 may select resource units 106A, 106C that share similar or identical characteristics. For instance, feature group 108 may wish to assess different test upgrades 304 that target network devices to implement a new networking protocol. Since the upgrade characteristics 112 of test upgrades 304A and 304B are similar, resource unit selection module 114 can accordingly select resource units 106A and 106C that meet those upgrade characteristics 112. Alternatively, system 102 may be configured to select one set of resource units 106A at which to deploy both test upgrades 304A and 304B. Stated another way, system 102 can evaluate test upgrades 304 in parallel by selecting multiple resource units 106 or sequentially by selecting a single set of resource units 106A.

Figure 3B:
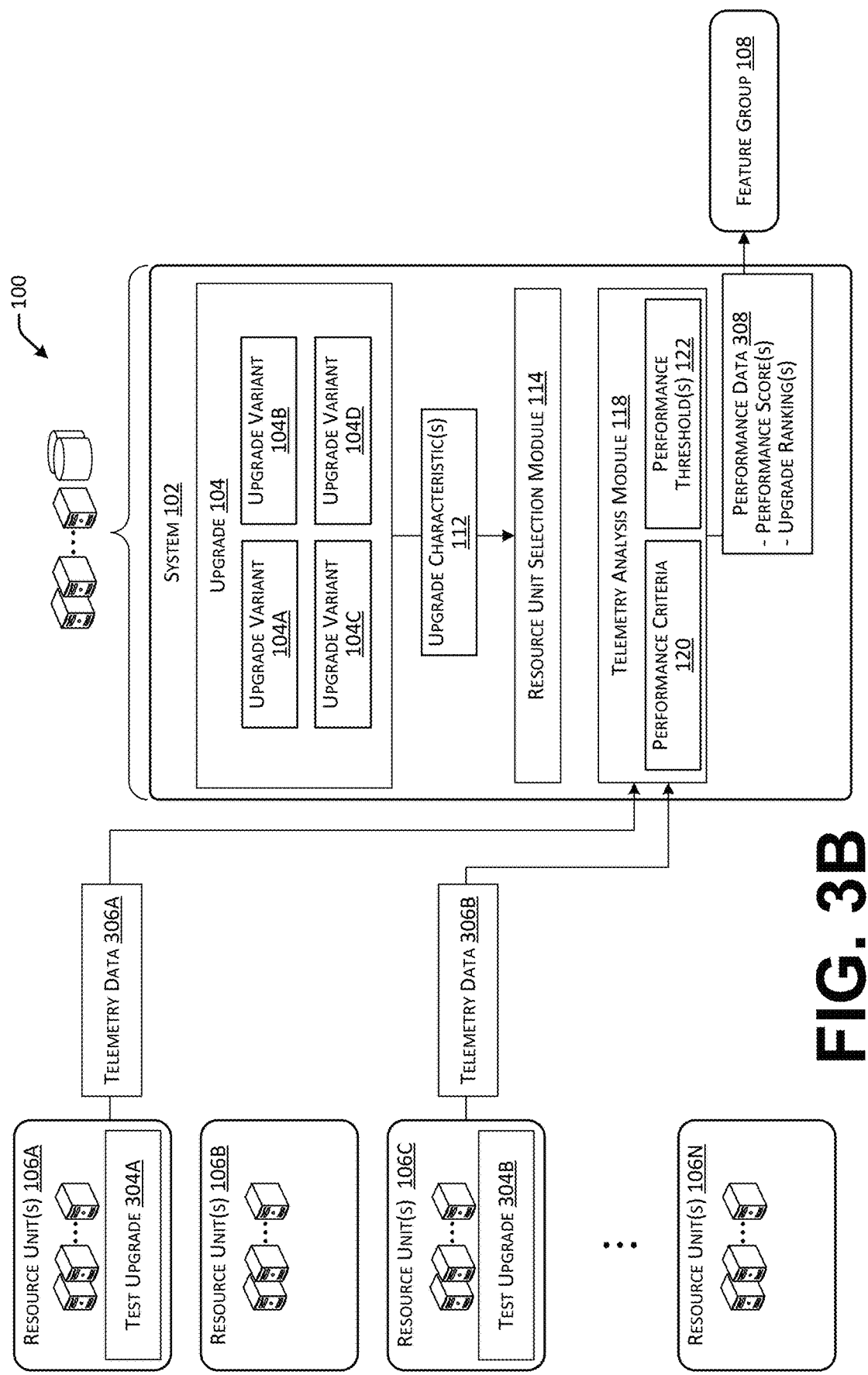
FIG. 3B illustrates aspects of the system in a second state of a process for evaluating performance for various sets of upgrade variants.

Following deployment of the test upgrades 304 to the sets of resource units 106A and 106C respectively, the system 102 can collect telemetry data 306A and 306B (may also be referred to herein as telemetry data 306) for each corresponding test upgrade 304 as shown in FIG. 3B. As discussed above, telemetry data 306 can include various types of data such as metrics, logs, traces, and the so forth. Upon receiving telemetry data 306, telemetry analysis module 118 can utilize performance criteria 120 and performance thresholds 122 to analyze the various types of data in telemetry data 306. In a specific example, a performance criterion 120 may measure network latency for a given resource unit 106 executing a test upgrade 304. In this example, a performance threshold 122 can specify an acceptable network latency of eighty milliseconds and an optimal network latency of twenty milliseconds. In this way, telemetry analysis module 118 can introduce additional granularity when evaluating the performance of upgrade variants 104.

Based on the analysis of the telemetry data 306, telemetry analysis module 118 can generate performance data 308. Performance data 308 can include performance scores for each test upgrade 304. In various examples, performance scores can be a numerical score that is generated from a comparison of the telemetry data 306 against the performance criteria 120 and performance thresholds 122. Continuing with the network latency example above, telemetry analysis module 118 may detect that the network latency for resource units 106A that are executing test upgrade 304A exceeds eighty milliseconds. Conversely, telemetry analysis module 118 may detect that the network latency for resource units 106C executing test upgrade 304B falls below twenty milliseconds. Accordingly, telemetry analysis module 118 may assign a high performance score to test upgrade 304B and a low performance score to test upgrade 304A in performance data 308. Alternatively, telemetry analysis module 118 may detect that an upgrade variant 104B does not satisfy a performance threshold. In response, the system 102 may automatically remove or otherwise disable upgrade variant 104B from deployment. For instance, if a measured network latency for upgrade variant 104B exceeds eighty milliseconds, system 102 may remove upgrade 104B from deployment.

It should be understood that, for the sake of simplicity, only one metric is mentioned in the above example. However, a performance score can represent several performance metrics rather than merely a single metric. For instance, a performance score can be calculated based on an aggregation of metric scores such as resource usage, power consumption, network latency, and so forth. In addition, individual metric scores may be optionally weighted to emphasize or deemphasize their influence in determining performance scores. In various examples, telemetry analysis module 118 may also utilize a machine learning model to determine performance criteria 120, performance thresholds 122, as well as the various weights that correspond to individual metric scores. For instance, in the above-mentioned example, telemetry analysis module 118 may determine that network latency is the most important metric and thus weight network latency more heavily compared to other metrics such as power consumption. Over time, telemetry analysis module 118 can refine the weightings for metric scores to suit various types of upgrades 104.

Furthermore, telemetry analysis module 118 can rank test upgrades 304 based on the performance scores in performance data 308. Alternatively, telemetry analysis module 118 can rank individual upgrade variants 104 to expose finer details for each test upgrade 304. Upgrade rankings and performance scores can subsequently be provided to feature group 108 as performance data 308 to grant detailed insights on the effectiveness of individual upgrade variants 104. Continuing with the networking protocol example discussed above, performance data 308 may indicate to feature group 108 that test upgrade 304B received a higher performance score than test upgrade 304A.

Figure 3C:
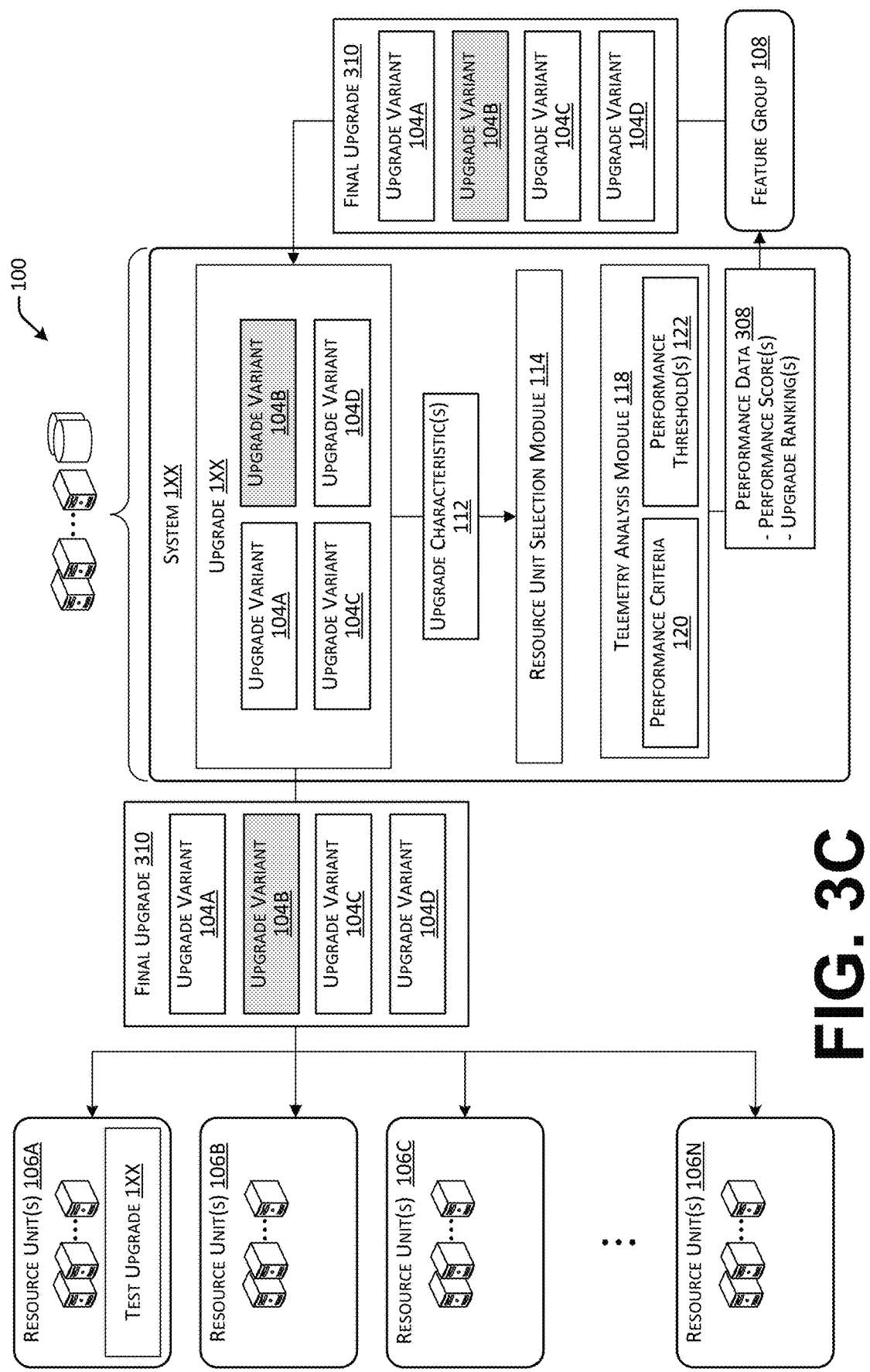
FIG. 3C illustrates aspects of the system in a third state of a process for evaluating performance for various sets of upgrade variants.

As shown in FIG. 3C, after considering the experiment results provided by performance data 308, feature group 108 have elected to omit upgrade variant 104B from final upgrade 310 in favor of upgrade variant 104C. In combination with the validation techniques shown and discussed in FIG. 1 through FIG. 2C, feature group 108 can safely deploy final upgrade 310 to the full plurality of applicable resource units 106. In the example discussed above, applicable resource units 106 can be all network devices in a particular server farm, geographic region, or even the entire cloud platform. In this way, feature group 108 can quickly and efficiently compare and contrast upgrade variants 104. In a specific example, nimble small-scale testing as illustrated in FIGS. 3A-3C can contribute to rapid mitigation of various errors. Consider an enterprise that utilizes a cloud-based service to host an important database. Utilizing the small-scale testing and validation techniques discussed herein enables a service provider to quickly determine a root cause for any erroneous behavior and implement a fix while minimizing disruptions to database operations.

Figure 4:
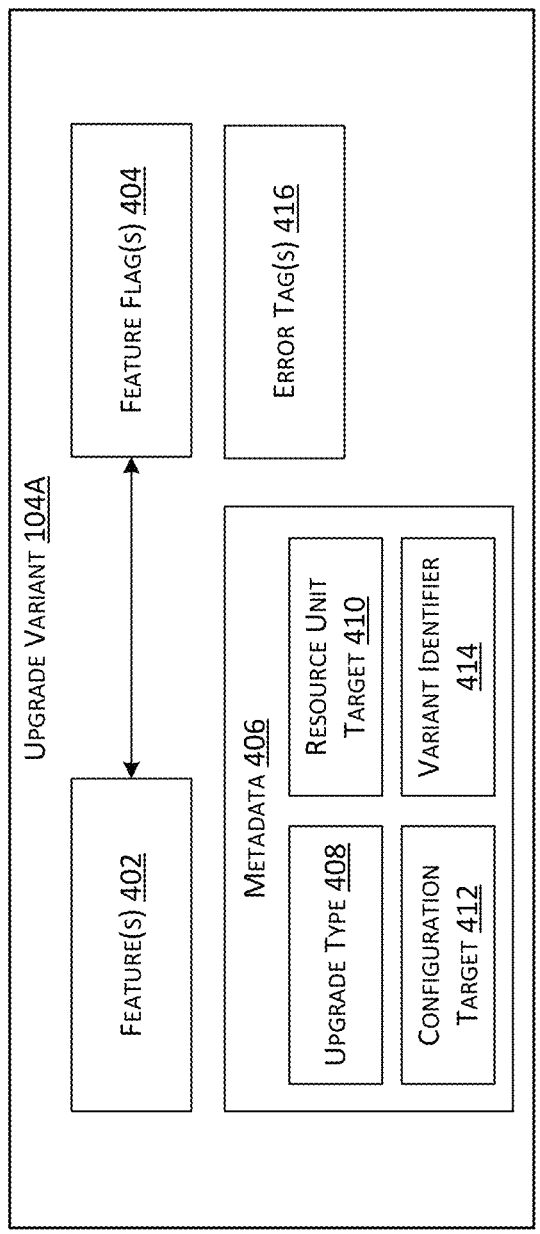
FIG. 4 illustrates aspects of an individual upgrade variant.

Turning now to FIG. 4, aspects of an individual upgrade variant 104A are shown and described. As discussed above, an upgrade variant 104A can implement a certain set of features 402 where different upgrade variants 104 implement different sets of features 402. In addition, individual features 402 can be enabled or disabled by a corresponding feature flag 404. For instance, in the examples shown in FIG. 3A through FIG. 3C, a test upgrade 304A may utilize feature flags 404 to disable a certain upgrade variant 104C rather than omit upgrade variant 104C entirely. In this way, if experimentation indicates that an upgrade variant 104C is more performant than another upgrade 104B, feature flags 404 can be configured to enable upgrade variant 104C and disable upgrade variant 104B. Thus, system 102 can reduce network traffic by merely communicating updated configurations for feature flags 404 as opposed to deploying a full final upgrade 310.

Upgrade variant 104A may additionally include metadata 406 that include various details pertaining to upgrade variant 104A. For instance, metadata 406 can specify an upgrade type 408 (e.g., an operating system update, a security update, etc.), resource unit target 410 such as virtual machines and network devices, a configuration target 412 such as a specific operating system version, and a variant identifier 414. Inclusion of metadata 406 in upgrade variant 104A can enable several features such as generation of upgrade characteristics 112 for resource unit selection module 114. In addition, metadata 406 can include error tags 416 to associate problems that occur with the upgrade variant 104A that caused the problem. Including error tags 416 and a variant identifier 414, in upgrade variant 104A can allow for more efficient generation of telemetry data 116 which may lead to more rapid testing of upgrade variants 104A.

Figure 5A:
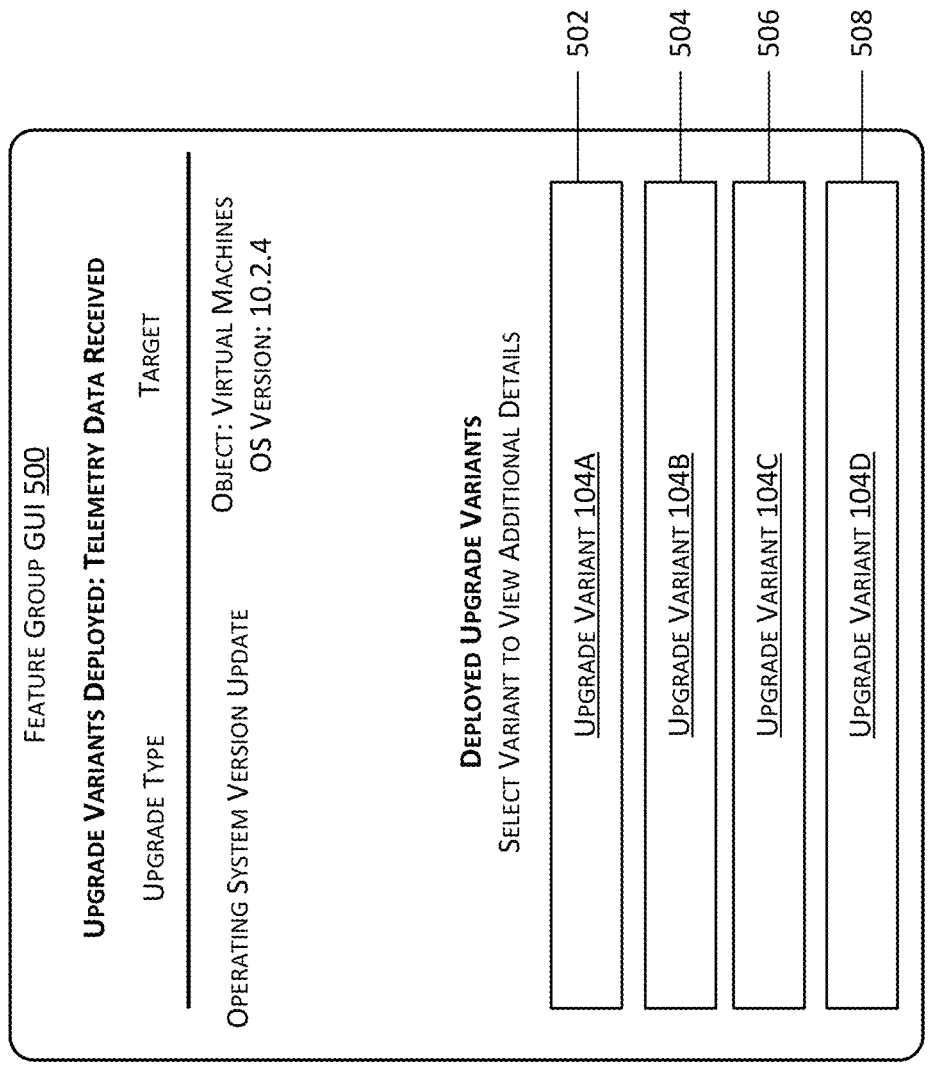
FIG. 5A is an example graphical user interface illustrating how telemetry data results and analysis can be displayed to a feature group.

Proceeding to FIG. 5A, an example graphical user interface (GUI) 500 illustrates how telemetry data 116 and analysis can be presented to a feature group 108. As illustrated, feature group GUI 500 can present details of an active deployment for a set of upgrade variants 104A-104D such as an upgrade type (e.g., "Operating System Version Update"), a targeted resource unit 106 ("Object: Virtual Machines") as well as a target configuration ("OS Version 10.2.4"). Feature group GUI can additionally provide selectable elements 502-508 that correspond to individual upgrade variants 104A-104D which a user may select to view additional details and analysis for a particular upgrade variant 104A. It should be understood that the system can receive the selection of an element 502-508 by way of any suitable user input including but not limited to a touch-sensitive display, a pointing device such as a mouse or stylus and the like.

Figure 5B:
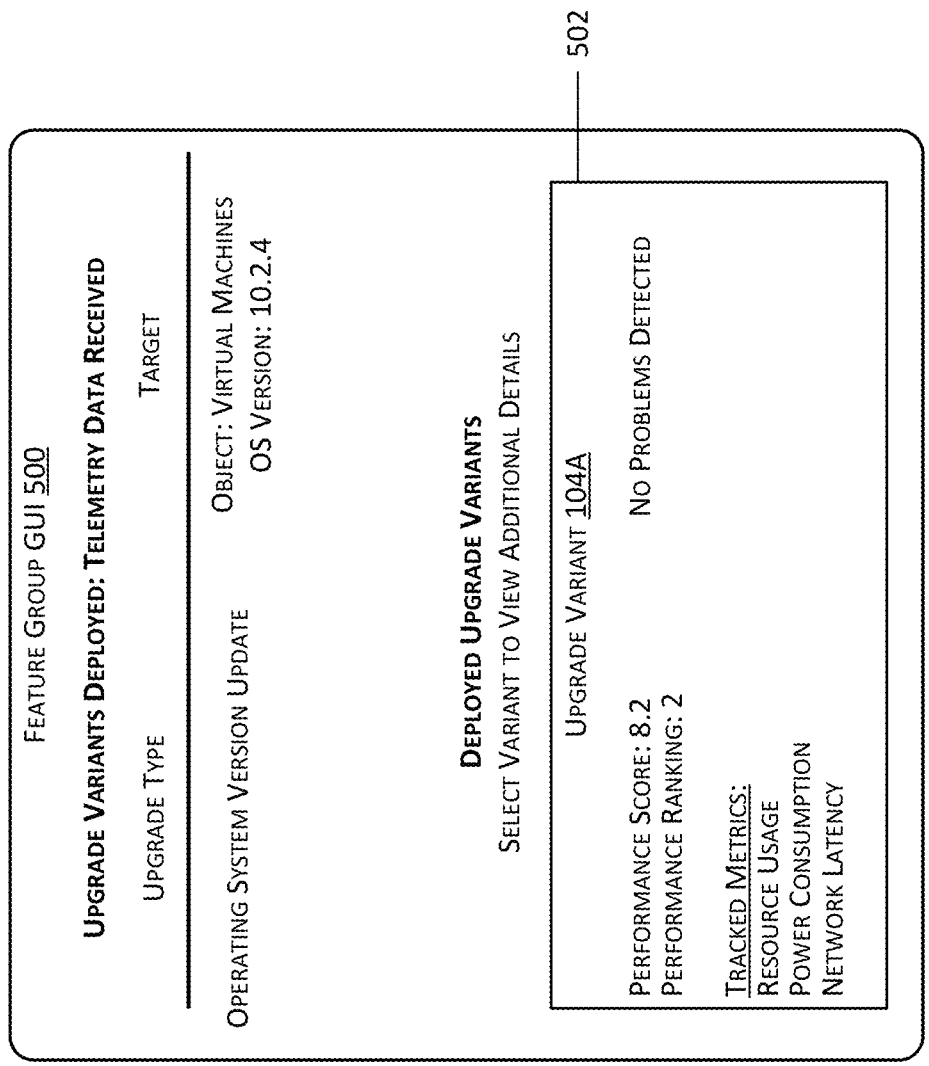
FIG. 5B is an example graphical user interface illustrating how performance data for an upgrade variant can be displayed to a feature group.

For example, as shown in FIG. 5B, a user has selected element 502 to view additional details for upgrade variant 104A. In response, selectable element 502 has expanded to inform the user that no problems have been detected. The expanded element 502 can also present performance data 308 based on analysis of telemetry data 116 such as a performance score ("8.2") and performance ranking ("2"). In addition, the expanded element 502 can inform the user of the various metrics that were used to calculate the performance score.

Figure 5C:
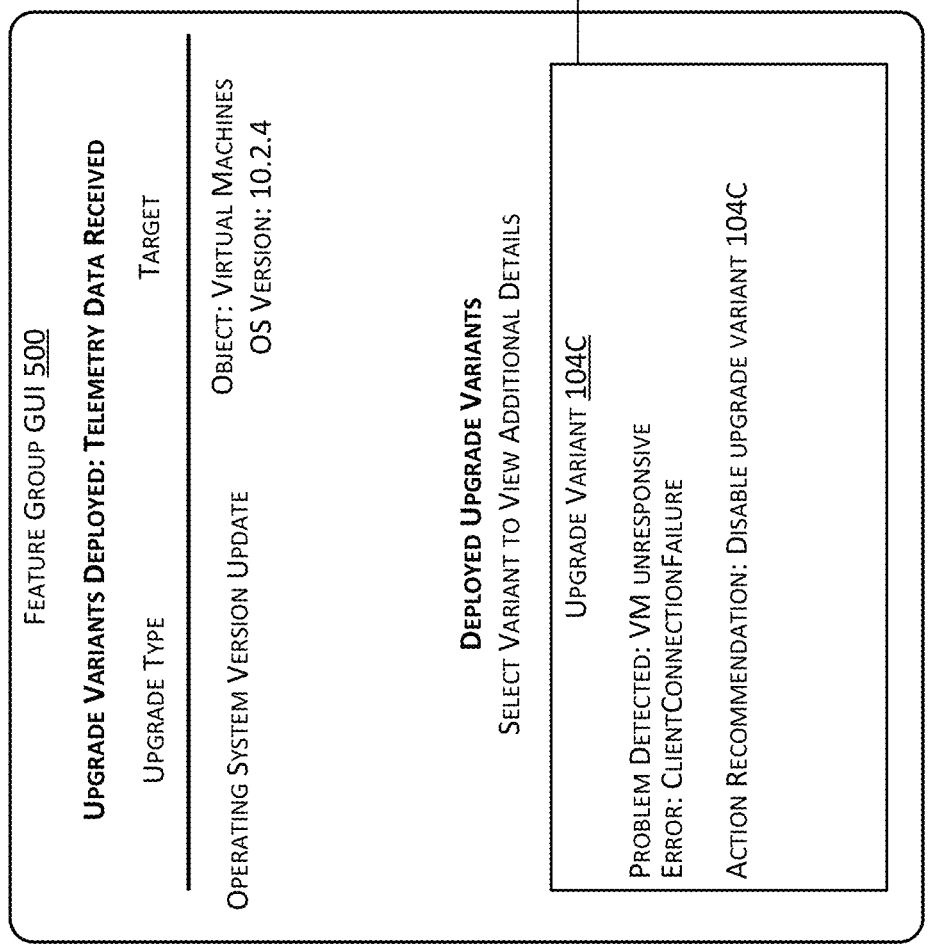
FIG. 5C is an example graphical user interface illustrating how errors and action recommendation can be displayed to a feature group.

In another example, FIG. 5C illustrates expanded element 506 alerting feature group 108 to a problem that has occurred at resource units 106A. In this example, one or more virtual machines that executed upgrade variant 104C have become unresponsive. Expanded element 506 can also provide an error code ("ClientConnectionFailure") to assist feature group 108 in determining a root cause of the error. In this example, the virtual machines that executed upgrade variant 104C are failing to connect to a network. Accordingly, expanded element includes an action recommendation 124 proposing that feature group 108 disable upgrade variant 104C.

Figure 6:
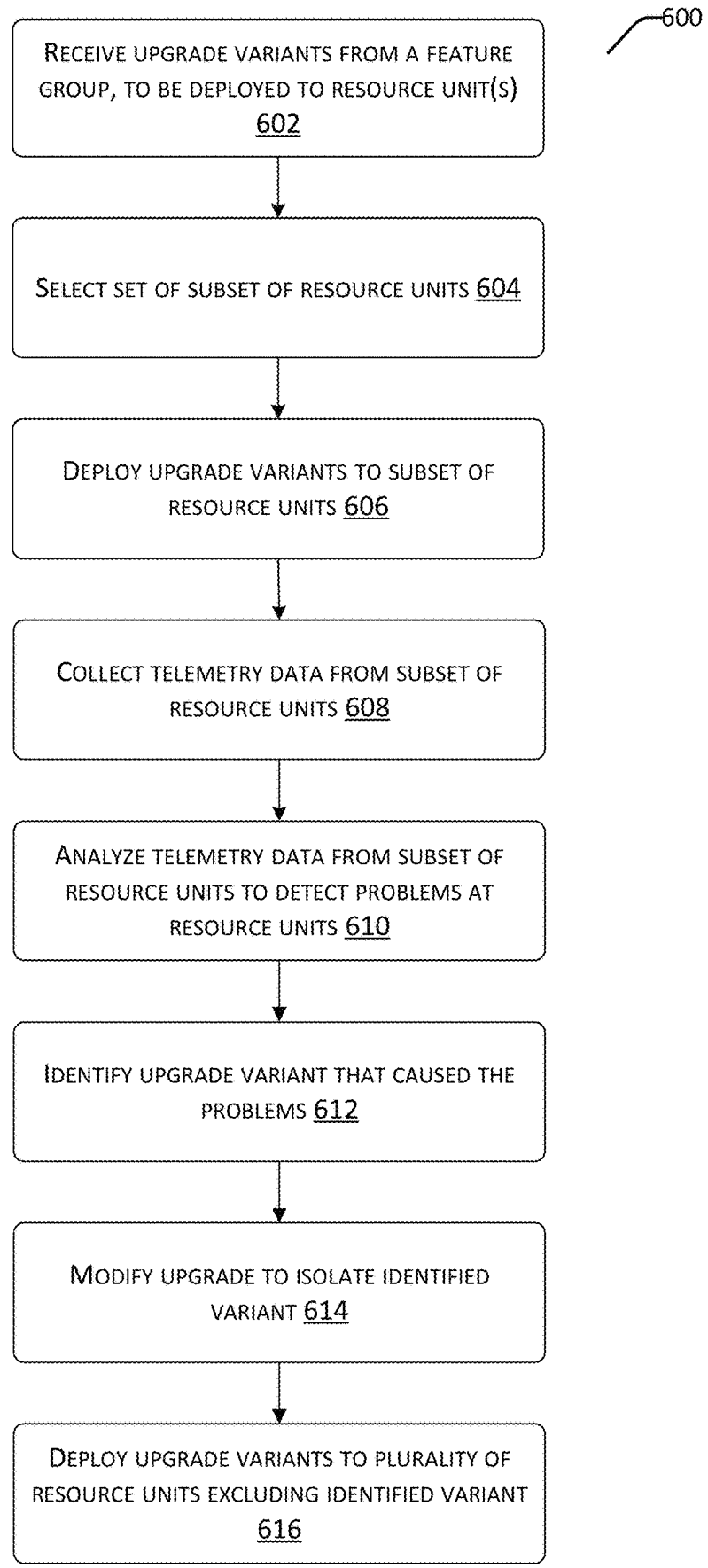
FIG. 6 is a flow diagram of an example method for deploying a set of upgrade variants.

Turning now to FIG. 6, aspects of a routine for enabling small-scale deployment of resource units upgrade variants 104A-104D are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 6, routine 600 begins at operation 602 where a system receives a plurality of upgrade variants from a feature group for deployment to resource units. As discussed above, resource units can include various low-level infrastructure objects such as virtual machines, physical machines, network devices, containers and the like.

Next, at operation 606, the system selects a set of resource units from a plurality of resource units.

At operation 608, the system collects telemetry data from the set of resource units that received the upgrade variants.

Proceeding to operation 610, the system then analyzes the telemetry data to detect whether problems have occurred at the selected set of resource units. As discussed above, a problem can include unresponsive resource units, application crashes, degraded performance, high latency, abnormal resource usage, and the like.

Next, at operation 612, the system can identify upgrade variants that caused the problems.

At subsequent operation 614, the system can modify the upgrade to isolate the identified variants. As discussed above, isolating variants can include removing the variant from deployment.

Finally at subsequent operation 616, the system can deploy the upgrade variants, excluding the identified variant, to the plurality of resource units.

Figure 7:
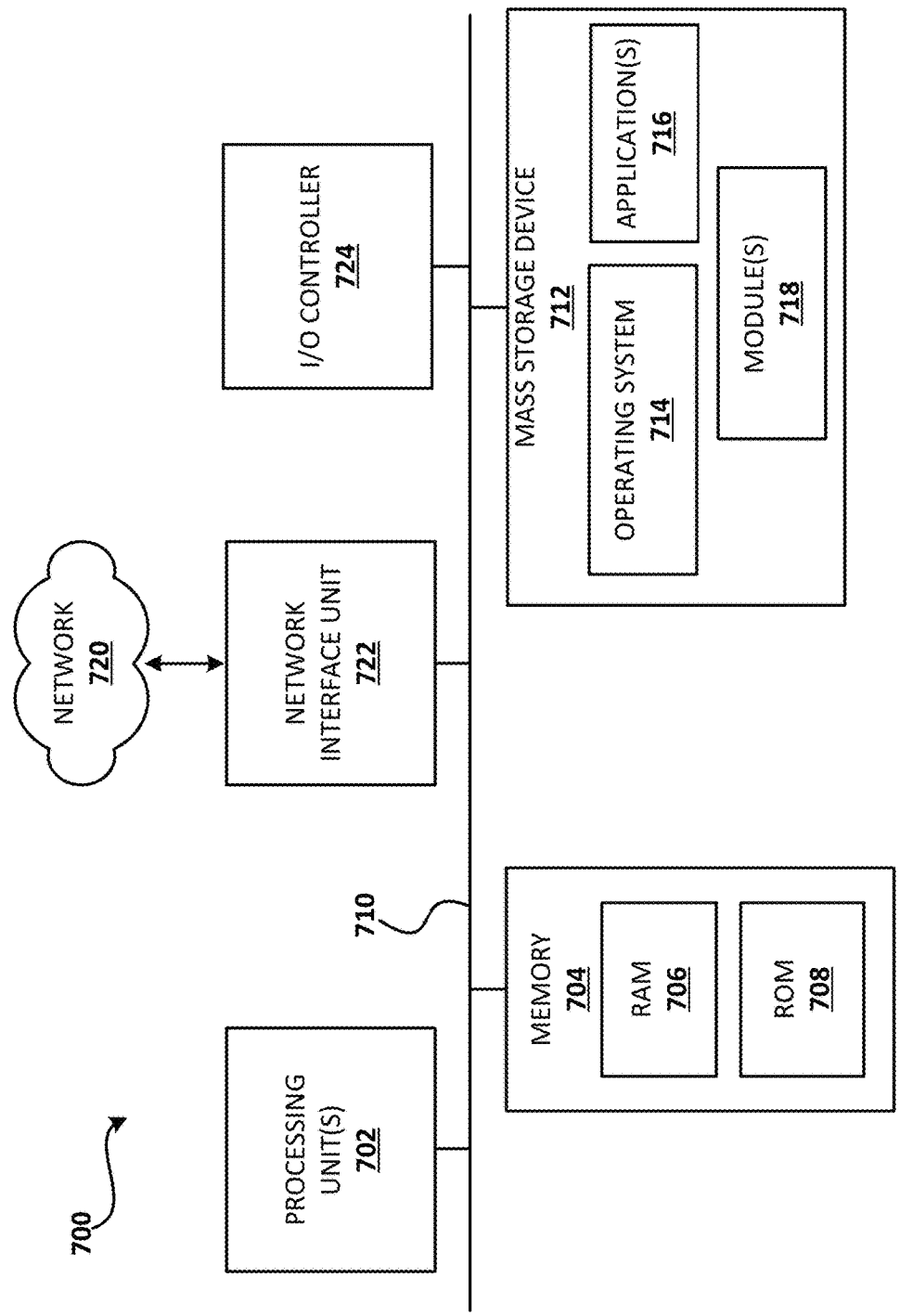
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the system 100, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
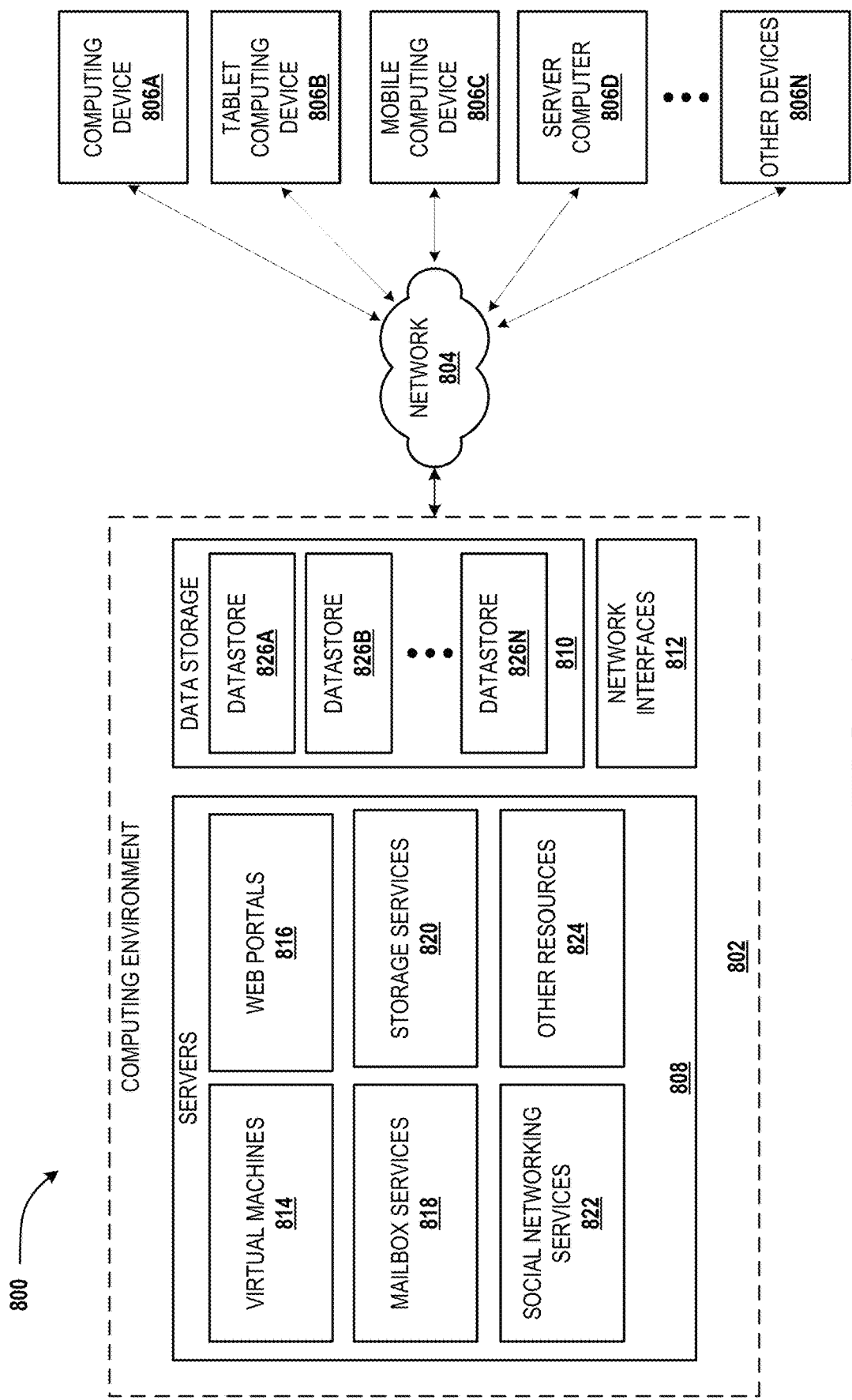
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 708 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method for deploying an upgrade to a network computing environment that comprises a plurality of resource units, the method comprising: receiving a plurality of variants of the upgrade, wherein one or more features of each variant of the plurality of variants is different from other variants of the plurality of variants; selecting a set of resource units from the plurality of resource units; deploying the plurality of variants of the upgrade to the selected set of resource units; collecting, by one or more processing units, telemetry data from the plurality of variants at the set of resource units; analyzing the telemetry data to detect that a problem has occurred at the set of resource units in response to execution of the plurality of variants of the upgrade; identifying, based at least in part on the analysis, a variant that caused the problem that occurred at the set of resource units; modifying the upgrade to isolate the identified variant; and deploying the plurality of variants of the upgrade, excluding the identified variant, to the plurality of resource units.

Example Clause B, the method of Example Clause A, further comprising: modifying the identified variant to prevent additional problems; and deploying the modified identified variant to the plurality of resource units.

Example Clause C, the method of Example Clause A or Example Clause B, wherein an individual resource unit of the plurality of resource units comprises a virtual machine, a physical machine, a network device, or a container.

Example Clause D, the method of any one of Example Clause A through C, wherein the upgrade is deployed during a period of time that is predefined by a feature group deploying the upgrade.

Example Clause E, the method of any one of Example Clause A through D, wherein the upgrade comprises at least one of a software update, a firmware update, a security update, or a configuration change.

Example Clause F, the method of any one of Example Clause A through E, wherein the set of resource units is selected based on at least one of a resource type of the set of resource units, a configuration type of the resource units, an upgrade type of the plurality of variants, or a variant identifier of the plurality of variants.

Example Clause G, the method of Example Clause A through F, wherein a size of the set of resource units is determined based on a number of variants of the plurality of variants.

Example Clause H, the method of any one of Example Clause A through G, further comprising: determining a level of performance for each variant; and determining that the level of performance for one or more variants does not satisfy a threshold level of performance; in response to the determining, removing the one or more variants from the plurality of variants for deployment.

Example Clause I, a system for deploying an upgrade to a network computing environment that comprises a plurality of resource units comprising: one or more processing units; and a computer-readable medium having encoded thereon computer-readable instructions, that when executed by the one or more processing units cause the system to: receive a plurality of variants of the upgrade, wherein one or more features of each variant of the plurality of variants is different from other variants of the plurality of variants; select a set of resource units from the plurality of resource units; deploy the plurality of variants of the upgrade to the selected set of resource units; collect telemetry data from the plurality of variants at the set of resource units; analyze the telemetry data to detect that a problem has occurred at the set of resource units in response to execution of the plurality of variants of the upgrade; identify, based at least in part on the analysis, a variant that caused the problem that occurred at the set of resource units; modify the upgrade to isolate the identified variant; and deploy the plurality of variants of the upgrade, excluding the identified variant, to the plurality of resource units.

Example Clause J, the system of Example Clause I, wherein the computer-readable instructions further cause the one or more processing units to: modify the identified variant to prevent additional problems; and deploy the modified identified variant to the plurality of resource units.

Example Clause K, the system of Example Clause I or Example Clause J, wherein an individual resource unit of the plurality of resource units comprises a virtual machine, a physical machine, a network device, or a container.

Example Clause L, the system of any one of Example Clause I through K, wherein the upgrade is deployed during a period of time that is predefined by a feature group deploying the upgrade.

Example Clause M, the system of any one of Example Clause I through L, wherein the set of resource units is selected based on at least one of a resource type of the set of resource units, a configuration type of the resource units, an upgrade type of the plurality of variants, or a variant identifier of the plurality of variants.

Example Clause N, the system of any one of Example Clause I through M, wherein the computer-readable instructions further cause the one or more processing units to: determine a level of performance for each variant; and determine that the level of performance for one or more variants does not satisfy a threshold level of performance; in response to the determining, remove the one or more variants from the plurality of variants for deployment.

Example Clause O, a system for deploying an upgrade to a network computing environment that comprises a plurality of resource units comprising: one or more processing units; and a computer-readable medium having encoded thereon computer-readable instructions, that when executed by the one or more processing units cause the system to: receive a plurality of variants of an upgrade, wherein one or more features of each variant of the plurality of variants is different from other variants of the plurality of variants; select a set of resource units from a plurality of resource units; deploy the plurality of variants of the upgrade to the selected set of resource units; collect telemetry data from the plurality of variants at the set of resource units; analyze the telemetry data to determine a level of performance for each variant; determine that the level of performance for one or more variants does not satisfy a threshold level of performance; in response to the determining, remove the one or more variants from the plurality of variants for deployment; and deploy the plurality of variants of the upgrade, excluding the one or more variants that do not satisfy the threshold level of performance, to the plurality of resource units.

Example Clause P, the system of Example Clause O, wherein the upgrade comprises at least one of a software update, a firmware update, a security update, or a configuration change.

Example Clause Q, the system of Example Clause O or Example Clause P, wherein the computer-readable instructions further cause the one or more processing units to: compare a first level of performance for a first variant and a second level of performance for a second variant; determine that the first level of performance exceeds the second level of performance; remove the second variant from the plurality of variants for deployment.

Example Clause R, the system of any one of Example Clause O through Q, wherein the upgrade is deployed during a period of time that is predefined by a feature group deploying the upgrade.

Example Clause S, the system of any one of Example Clause O through R, wherein the upgrade is deployed during a period of time that is predefined by a feature group deploying the upgrade.

Example Clause T, the system of any one of Example Clause O through S, wherein a size of the set of resource units is determined based on a number of variants of the plurality of variants.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different variants, two different upgrades, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for deploying an upgrade to a network computing environment that comprises a plurality of resource units, the method comprising:
    receiving a plurality of variants of the upgrade, wherein one or more features of each variant of the plurality of variants is different from other variants of the plurality of variants;
    selecting a subset of resource units from the plurality of resource units wherein:
        the plurality of resource units comprises a first number of resource units;
        the subset of resource units comprises a second number of resource units; and
        the second number of resource units is less than the first number of resource units;
    receiving a deployment configuration including a setting defining a time period that is predefined by a feature group deploying the upgrade, wherein the time period ensures a maximal traffic to the upgrade;
    deploying the plurality of variants of the upgrade to the subset of resource units during the time period;
    collecting, by one or more processing units, telemetry data from the plurality of variants at the subset of resource units;
    analyzing the telemetry data to detect that a problem has occurred at the subset of resource units in response to execution of the plurality of variants of the upgrade;
    identifying, based at least in part on the analysis, a variant that caused the problem that occurred at the subset of resource units;
    modifying the upgrade to isolate the identified variant; and
    deploying the plurality of variants of the upgrade, excluding the identified variant, to the plurality of resource units.

2. The method of claim 1, further comprising:
    modifying the identified variant to prevent additional problems; and
    deploying the modified identified variant to the plurality of resource units.

3. The method of claim 1, wherein an individual resource unit of the plurality of resource units comprises a virtual machine, a physical machine, a network device, or a container.

4. The method of claim 1, wherein the upgrade comprises at least one of a software update, a firmware update, a security update, or a configuration change.

5. The method of claim 1, wherein the subset of resource units is selected based on at least one of a resource type of the subset of resource units, a configuration type of the subset of resource units, an upgrade type of the plurality of variants, or a variant identifier of the plurality of variants.

6. The method of claim 1, wherein a size of the subset of resource units is determined based on a number of variants of the plurality of variants.

7. The method of claim 1, further comprising:
    determining a level of performance for each variant;
    determining that the level of performance for one or more variants does not satisfy a threshold level of performance; and
    in response to the determining, removing the one or more variants from the plurality of variants for deployment.

8. A system for deploying an upgrade to a network computing environment that comprises a plurality of resource units comprising:
    one or more processing units; and
    a computer-readable medium having encoded thereon computer-readable instructions, that when executed by the one or more processing units cause the system to:
        receive a plurality of variants of the upgrade, wherein one or more features of each variant of the plurality of variants is different from other variants of the plurality of variants;
        select a subset of resource units from the plurality of resource units wherein:
            the plurality of resource units comprises a first number of resource units;
            the subset of resource units comprises a second number of resource units; and
            the second number of resource units is less than the first number of resource units;
        receive a deployment configuration including a setting defining a time period that is predefined by a feature group deploying the upgrade, wherein the time period ensures a maximal traffic to the upgrade;
        deploy the plurality of variants of the upgrade to the selected subset of resource units during the time period;
        collect telemetry data from the plurality of variants at the subset of resource units;
        analyze the telemetry data to detect that a problem has occurred at the subset of resource units in response to execution of the plurality of variants of the upgrade;

identify, based at least in part on the analysis, a variant that caused the problem that occurred at the subset of resource units;
modify the upgrade to isolate the identified variant; and
deploy the plurality of variants of the upgrade, excluding the identified variant, to the plurality of resource units.

9. The system of claim 8, wherein the computer-readable instructions further cause the one or more processing units to:
modify the identified variant to prevent additional problems; and
deploy the modified identified variant to the plurality of resource units.

10. The system of claim 8, wherein an individual resource unit of the plurality of resource units comprises a virtual machine, a physical machine, a network device, or a container.

11. The system of claim 8, wherein the subset of resource units is selected based on at least one of a resource type of the subset of resource units, a configuration type of the subset of resource units, an upgrade type of the plurality of variants, or a variant identifier of the plurality of variants.

12. The system of claim 8, wherein the computer-readable instructions further cause the one or more processing units to:
determine a level of performance for each variant;
determine that the level of performance for one or more variants does not satisfy a threshold level of performance; and
in response to the determining, remove the one or more variants from the plurality of variants for deployment.

13. A system for deploying an upgrade to a network computing environment that comprises a plurality of resource units comprising:
one or more processing units; and
a computer-readable medium having encoded thereon computer-readable instructions, that when executed by the one or more processing units cause the system to:
receive a plurality of variants of the upgrade, wherein one or more features of each variant of the plurality of variants is different from other variants of the plurality of variants;
select a subset of resource units from the plurality of resource units wherein:
the plurality of resource units comprises a first number of resource units;
the subset of resource units comprises a second number of resource units; and
the second number of resource units is less than the first number of resource units;
receive a deployment configuration including a setting defining a time period that is predefined by a feature group deploying the upgrade, wherein the time period ensures a maximal traffic to the upgrade;
deploy the plurality of variants of the upgrade to the selected subset of resource units during the time period;
collect telemetry data from the plurality of variants at the subset of resource units;
analyze the telemetry data to determine a level of performance for each variant in response to execution of the plurality of variants of the upgrade;
determine that the level of performance for one or more variants does not satisfy a threshold level of performance;
in response to the determining, remove the one or more variants from the plurality of variants for deployment; and
deploy the plurality of variants of the upgrade, excluding the one or more variants that do not satisfy the threshold level of performance, to the plurality of resource units.

14. The system of claim 13, wherein the upgrade comprises at least one of a software update, a firmware update, a security update, or a configuration change.

15. The system of claim 13, wherein the computer-readable instructions further cause the one or more processing units to:
compare a first level of performance for a first variant and a second level of performance for a second variant;
determine that the first level of performance exceeds the second level of performance; and
remove the second variant from the plurality of variants for deployment.

16. The system of claim 13, wherein the subset of resource units is selected based on at least one of a resource type of the subset of resource units, a configuration type of the subset of resource units, an upgrade type of the plurality of variants, or a variant identifier of the plurality of variants.

17. The system of claim 13, wherein a size of the subset of resource units is determined based on a number of variants of the plurality of variants.

\* \* \* \* \*